United States Patent
Okino et al.

(10) Patent No.: US 7,738,213 B2
(45) Date of Patent: Jun. 15, 2010

(54) MAGNETIC DISK MEDIUM, RETICLE AND MAGNETIC RECORDING AND REPRODUCING APPARATUS

(75) Inventors: Takeshi Okino, Yokohama (JP); Seiji Morita, Yokohama (JP); Masatoshi Sakurai, Tokyo (JP); Shinobu Sugimura, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 898 days.

(21) Appl. No.: 11/448,977

(22) Filed: Jun. 8, 2006

(65) Prior Publication Data
US 2006/0280974 A1     Dec. 14, 2006

(30) Foreign Application Priority Data
Jun. 10, 2005  (JP) .............................. 2005-170714

(51) Int. Cl.
*G11B 5/667* (2006.01)
(52) U.S. Cl. ..................................................... 360/135
(58) Field of Classification Search .................. None
See application file for complete search history.

(56) References Cited

U.S. PATENT DOCUMENTS

| | | | |
|---|---|---|---|
| 3,286,251 A | 11/1966 | Rendler | |
| 5,274,510 A | 12/1993 | Sugita et al. | |
| 5,466,904 A | 11/1995 | Pfeiffer et al. | |
| 5,545,902 A | 8/1996 | Pfeiffer et al. | |
| 5,587,850 A | 12/1996 | Ton-that | |
| 5,600,506 A | 2/1997 | Baum et al. | |
| 5,748,421 A | 5/1998 | Taki et al. | |
| 5,828,536 A | 10/1998 | Morita | |
| 5,875,083 A | 2/1999 | Oniki et al. | |
| 5,903,411 A * | 5/1999 | Tomita et al. | 360/78.14 |
| 5,907,448 A | 5/1999 | Watanabe et al. | |
| 6,144,517 A | 11/2000 | Watanabe et al. | |
| 6,424,479 B1 | 7/2002 | Hayashi | |
| 6,433,950 B1 | 8/2002 | Liikanen | |
| 6,529,341 B1 | 3/2003 | Ishida et al. | |
| 6,563,673 B2 | 5/2003 | Mundt et al. | |
| 6,667,849 B2 | 12/2003 | Sasaki et al. | |
| 6,748,865 B2 | 6/2004 | Sakurai et al. | |
| 6,805,966 B1 | 10/2004 | Formato et al. | |
| 6,877,343 B2 | 4/2005 | Watanabe et al. | |

(Continued)

FOREIGN PATENT DOCUMENTS

JP     1-235047     9/1989

(Continued)

OTHER PUBLICATIONS

U.S. Appl. No. 11/372,342, filed Mar. 10, 2006.

(Continued)

*Primary Examiner*—Mark Blouin
(74) *Attorney, Agent, or Firm*—Nixon & Vanderhye, PC

(57) ABSTRACT

A magnetic disc medium according to an aspect of the present invention includes: a preamble part in a servo area of each of sectors obtained by dividing a surface of the medium in a circumference direction, the preamble part including strip-shaped patterns formed of a plurality of magnetic materials, and each of the strip-shaped patterns formed of the magnetic materials being divided by non-magnetic materials at periodic intervals.

18 Claims, 11 Drawing Sheets

U.S. PATENT DOCUMENTS

| | | | |
|---|---|---|---|
| 6,887,626 B2 | 5/2005 | Koba | |
| 6,961,203 B1 | 11/2005 | Baker | |
| 6,967,798 B2 | 11/2005 | Homola et al. | |
| 7,031,086 B2 | 4/2006 | Nishida et al. | |
| 7,035,036 B2 | 4/2006 | Shimomura et al. | |
| 7,097,924 B2 | 8/2006 | Haginoya et al. | |
| 7,147,790 B2 | 12/2006 | Wachenschwanz et al. | |
| 7,150,844 B2 | 12/2006 | Deeman et al. | |
| 7,214,624 B2 | 5/2007 | Fujita et al. | |
| 7,215,502 B2* | 5/2007 | Tagami | 360/77.08 |
| 7,319,568 B2 | 1/2008 | Okino et al. | |
| 7,323,258 B2 | 1/2008 | Kamata et al. | |
| 7,351,445 B2 | 4/2008 | Haginoya et al. | |
| 7,362,528 B2 | 4/2008 | Moriya et al. | |
| 7,388,725 B2 | 6/2008 | Sakurai et al. | |
| 7,412,926 B2 | 8/2008 | Sakurai et al. | |
| 7,575,705 B2 | 8/2009 | Sakurai et al. | |
| 2002/0098423 A1 | 7/2002 | Koba | |
| 2002/0131199 A1* | 9/2002 | Takeo | 360/97.01 |
| 2002/0168548 A1 | 11/2002 | Sakurai et al. | |
| 2003/0063403 A1 | 4/2003 | Nishikawa et al. | |
| 2004/0101713 A1 | 5/2004 | Wachenschwanz et al. | |
| 2004/0166372 A1 | 8/2004 | Haginoya et al. | |
| 2005/0069732 A1 | 3/2005 | Kamata et al. | |
| 2005/0079283 A1 | 4/2005 | Sakurai et al. | |
| 2005/0094298 A1 | 5/2005 | Sakurai et al. | |
| 2005/0117253 A1* | 6/2005 | Moriya et al. | 360/135 |
| 2005/0175905 A1 | 8/2005 | Amemiya | |
| 2005/0219730 A1 | 10/2005 | Sakurai et al. | |
| 2005/0225890 A1 | 10/2005 | Sakurai et al. | |
| 2006/0012905 A1 | 1/2006 | Okino et al. | |
| 2006/0065143 A1 | 3/2006 | Sakurai et al. | |
| 2006/0066984 A1* | 3/2006 | Tagami | 360/75 |
| 2006/0076509 A1 | 4/2006 | Okino et al. | |
| 2006/0172155 A1 | 8/2006 | Okino et al. | |
| 2006/0222899 A1 | 10/2006 | Sugimura et al. | |
| 2006/0222967 A1 | 10/2006 | Okino et al. | |
| 2006/0226116 A1 | 10/2006 | Haginoya et al. | |
| 2007/0211592 A1 | 9/2007 | Sakurai et al. | |

FOREIGN PATENT DOCUMENTS

| | | |
|---|---|---|
| JP | 04-291256 | 10/1992 |
| JP | 11-259916 | 9/1994 |
| JP | H06-259709 | 9/1994 |
| JP | H06-274867 | 9/1994 |
| JP | 7-201726 | 8/1995 |
| JP | 07-201726 | 8/1995 |
| JP | 09-097482 | 4/1997 |
| JP | 09-204747 | 8/1997 |
| JP | 09-251940 | 9/1997 |
| JP | H11-144218 | 5/1999 |
| JP | 2000-020945 | 1/2000 |
| JP | 2000-339670 | 12/2000 |
| JP | 2001-143257 | 5/2001 |
| JP | 2001-312819 | 11/2001 |
| JP | 2002-8965 | 1/2002 |
| JP | 2002-334414 | 1/2002 |
| JP | 2002-50565 | 2/2002 |
| JP | 2005-166141 | 6/2002 |
| JP | 2002-217088 | 8/2002 |
| JP | 2002-222750 | 8/2002 |
| JP | 2002-280290 | 9/2002 |
| JP | 2002-334414 | 11/2002 |
| JP | 2002-342986 | 11/2002 |
| JP | 2002-343710 | 11/2002 |
| JP | 2002-367178 | 12/2002 |
| JP | 2003-141715 | 5/2003 |
| JP | 2003-142371 | 5/2003 |
| JP | 2003-157520 | 5/2003 |
| JP | 2003-263850 | 9/2003 |
| JP | 2003-281841 | 10/2003 |
| JP | 2004-072024 | 3/2004 |
| JP | 2004-109573 | 4/2004 |
| JP | 2004-110896 | 4/2004 |
| JP | 2004-158579 | 6/2004 |
| JP | 2004-179411 | 6/2004 |
| JP | 2004-259306 | 9/2004 |
| JP | 2004-265486 | 9/2004 |
| JP | 2004-311839 | 11/2004 |
| JP | 2005-166141 | 6/2005 |
| JP | 2005-293730 | 10/2005 |
| JP | 2006-031851 | 2/2006 |
| WO | 03/091805 | 11/2003 |

OTHER PUBLICATIONS

U.S. Appl. No. 11/341,849, filed Jan. 30, 2006.
Office Action in Japanese Application No. 2007-170714 dated Sep. 25, 2009 and English-language translation thereof.
Berger et al., *New approach to projection-electron lithography with demonstrated 0.1μm linewidth*, Appl. Phys. Lett. 57 (2), Jul. 9, 1990, pp. 153-155.
U.S. Appl. No. 11/372,342 filed Mar. 10, 2006.
U.S. Appl. No. 11/341,849 filed Jan. 30, 2006.

* cited by examiner

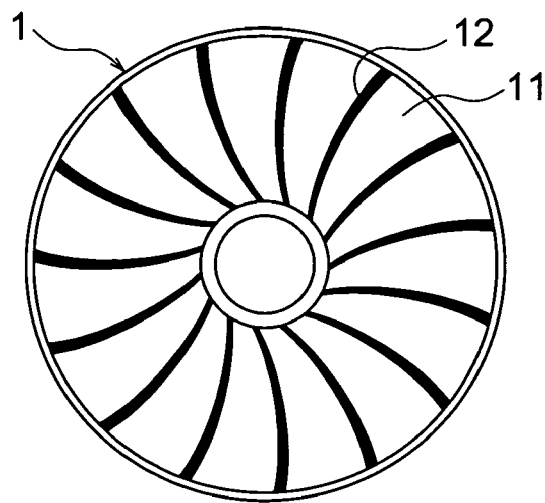
FIG. 3
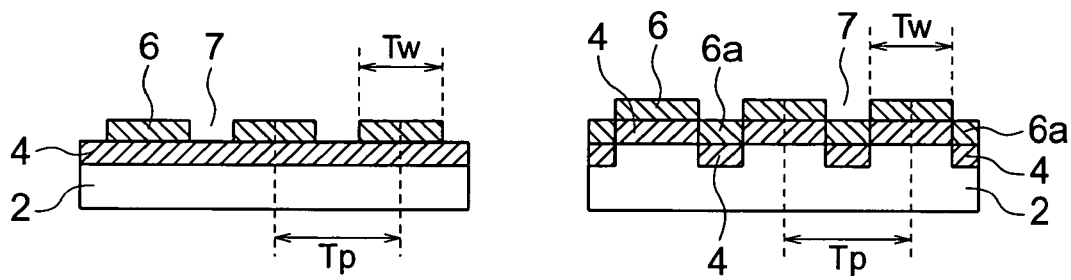
FIG. 4A
FIG. 4B
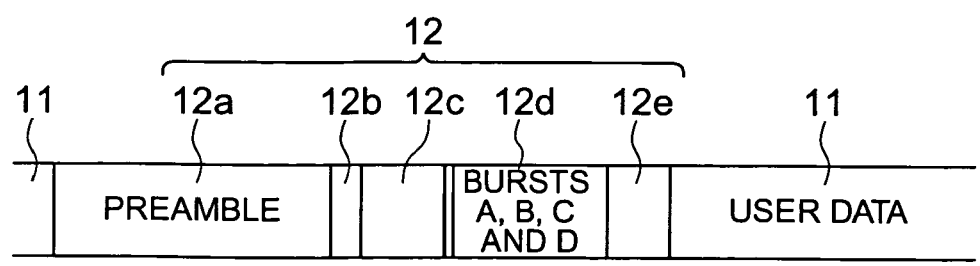
FIG. 5

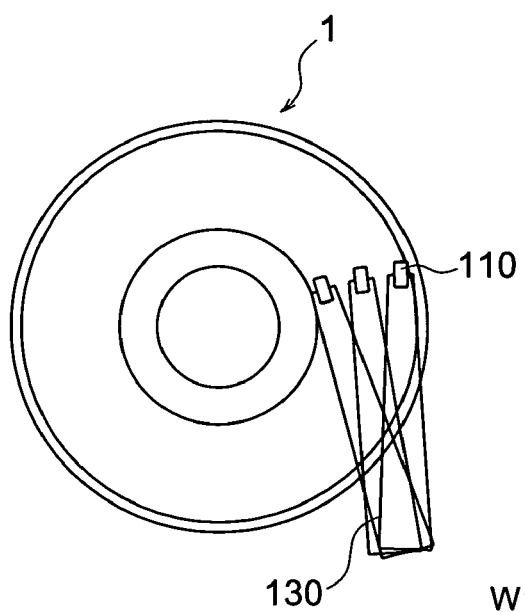
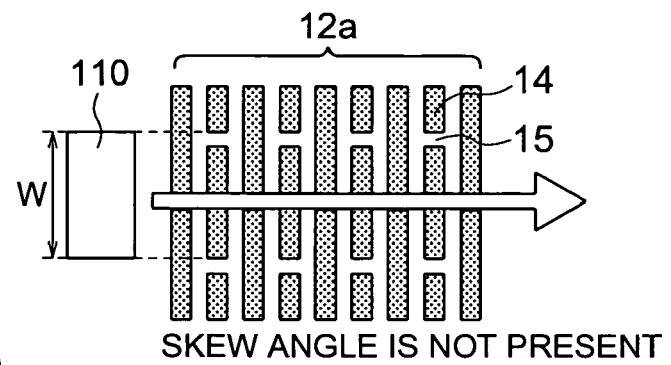
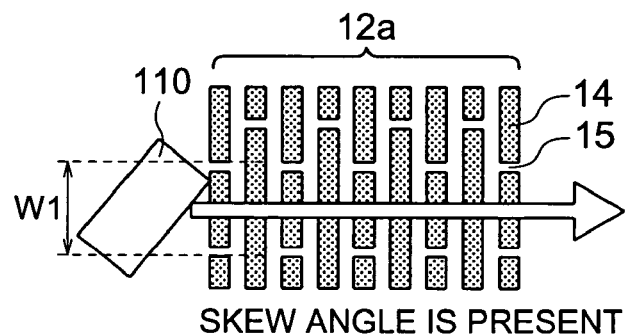
FIG. 7A
FIG. 7B
FIG. 7C

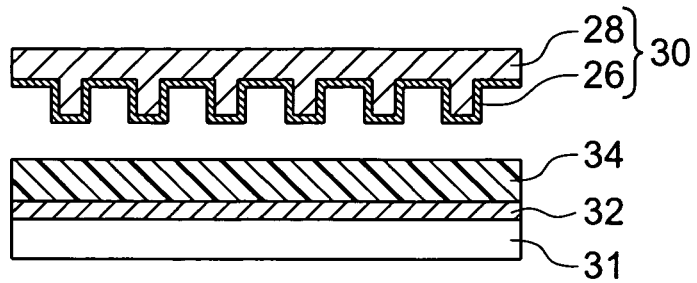
FIG. 13A
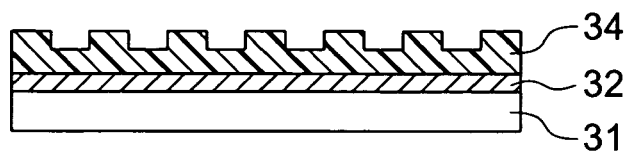
FIG. 13B
FIG. 13C
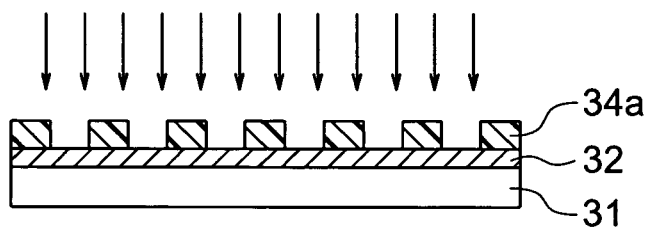
FIG. 13D
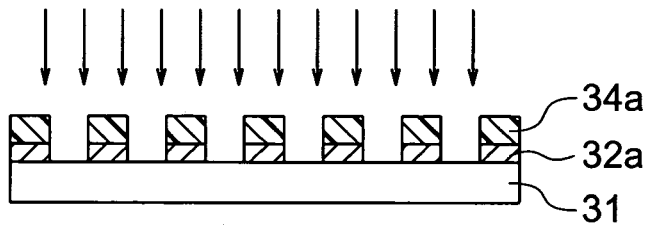
FIG. 13E
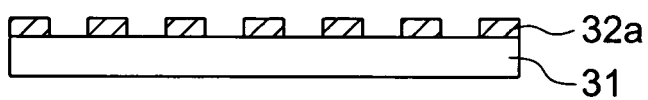
FIG. 13F
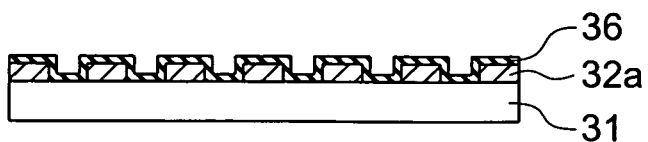

MAGNETIC DISK MEDIUM, RETICLE AND MAGNETIC RECORDING AND REPRODUCING APPARATUS

CROSS-REFERENCE TO RELATED APPLICATION

This application is based upon and claims the benefit of priority from prior Japanese Patent Application No. 2005-170714 filed on Jun. 10, 2005 in Japan, the entire contents of which are incorporated herein by reference.

BACKGROUND OF THE INVENTION

1. Field of the Invention

The present invention relates to a magnetic disk medium, a reticle for reduction exposure used when manufacturing the magnetic disk medium, and a magnetic recording and reproducing apparatus.

2. Related Art

In the magnetic recording apparatus, magnetic disk apparatus and hard disk drive apparatus, there is a problem that magnetic information recorded by a recording and reproducing head which moves relatively on a magnetic disk medium is apt to exert bad influence upon recording on adjacent tracks because of heat fluctuation, as the recording density on the magnetic disk medium increases with an increase in capacity. Against this problem, it is possible to use means for eliminating the above-described bad influence by physically separating magnetic materials in adjacent tracks included in the magnetic medium. Magnetic disk media thus including magnetic materials each having a shape of a recording track or a recording bit, or magnetic disk media having patterns in which a magnetic material is divided by non-magnetic materials are called patterned media. Since tracks are divided, the media are called discrete tracks as well sometimes. (For example, see U.S. Pat. No. 6,563,673 and JP-A 2004-110896 (KOKAI).)

As for a technique for working on magnetic materials of such patterned media, a magnetic disk medium can be generated by drawing desired magnetic material patterns on an original disk by means of, for example, an original disk drawing system, generating an imprint stamper, and utilizing a nano-imprint method using the imprint stamper (see, for example, JP-A 2003-157520(KOKAI)). In fabrication of the original disk, its patterns can be formed by exposing a photosensitive resin to chemical rays such as a mercury lamp, ultraviolet rays, an electron beam or X-rays. In particular, a technique of irradiating directly an electron beam is desirable to form magnetic disk patterns which need fine pattern drawing in order to achieve a high recording density.

For example, if an original disk is fabricated by conducting EB (Electron Beam) irradiating on a positive type resist film, exposed parts become concave parts after development. If this original disk is electroformed to form a stamper, the exposed parts become convex parts. Therefore, an exposed discrete track groove becomes a convex arc when a stamper is formed. In addition, convex parts on the stamper surface are transformed to concave parts on a resist film by a nano-imprint process. In subsequent etching processing, a magnetic film or a substrate on a medium provided under the concave parts is etched. As a result, patterns of magnetic materials and non-magnetic materials or uneven patterns of magnetic materials are formed on the surface of the magnetic disk medium.

When conducting recording or reproducing on the magnetic disk medium by using a magnetic recording and reproducing head, recording or reproducing is conducted on a desired position on the medium surface by relatively moving the magnetic recording and reproducing head on the surface of the magnetic disk medium.

In order to move the recording and reproducing head to a desired position on the magnetic disk medium, a positioning servo area is present on the magnetic disk medium. At the time of recording or reproducing, a position of the recording and reproducing head on the magnetic disk medium is grasped on the basis of a position signal obtained from a reproducing head when the recording and reproducing head crosses the servo area. The recording and reproducing apparatus controls the position on the basis of the obtained position information, and moves the recording head as far as a desired recording position.

In the patterned media, it is desirable to generate a signal in the servo area collectively together with a data area as magnetic material patterns from the viewpoint of holding down the cost when fabricating the medium and obtaining a high position precision by generating the servo positioning signal and the recording patterns collectively.

The magnetic pattern shape in the servo area used in ordinary HDDs (hard disk drives) will now be described. The servo area includes at least a preamble area, an address area and a positioning burst area (or a burst area).

The preamble area functions to adjust an amplification factor of a signal amplifier and make the amplitude constant before reading out servo data. The preamble area precedes the address area and the positioning burst area in the servo area along the head sweeping direction. The preamble area is formed of a plurality of linear patterns which cross the track direction, so as to obtain a similar signal no matter which track position the head lies in.

The address area has information of a track number and a sector number, and the address area indicates a track position in which the head lies. Address information is written in the Gray code so as to make it possible to read data even if the head shifts to an adjacent track during seeking.

The burst area has a structure in which two or more pattern areas are arranged in the track direction. In each of the pattern areas, magnetic patterns are arranged at equal intervals in a direction crossing the tracks. A signal supplied from the burst area has deviation information in the track of the head position.

When conducting recording or reproducing on the patterned medium by using a floating head, an air flow between the head and the medium exerts great influence on the floating stability of the head. When generating a preamble signal by using a patterned medium, a recording area has uneven groove patterns which are parallel to the tracks whereas the preamble patterns are uneven groove patterns which cross the tracks. When the head moves from the recording area to the servo area at the time of recording and reproducing, the medium shape under the head passes from the uneven groove patterns parallel to the track direction to the uneven groove patterns crossing the tracks, the air flow right under the head varies, and the floating stability of the head is lost. Grooves between tracks generate a streamline flow in the circumferential direction, different external forces are given to the left and right of the head, and the floating stability of the head is hampered. Because of them, there is a problem that the head cannot read the servo signal or the data signal properly.

On the other hand, when the original disk is exposed to an electron beam, there is a precision error of the drawing position in the electron beam lithography system. When drawing fine patterns required for high recording density, pattern collapse caused by an error in the drawing precision occurs. As one of techniques for solving this problem, reduction projection exposure using a reticle can be used.

Even if there is position fluctuation to some degree in the patterns on the reticle, the magnitude of the fluctuation is also reduced by the reduction projection. Use of the electron beam reduction exposure brings about such an advantage.

As main electron beam reduction projection exposure techniques, the SCALPEL (Scattering with Angular Limitation in Projection Electron Lithography) technique described in S.D. Berger et al., Applied Physics Letters, 57, 153(1990) and the PREVAIL (Projection Exposure with Variable Axis Immersion Lens) technique described in Japanese Patent No. 2829942 can be mentioned. As masks used in these techniques, there are the stencil type and membrane type. When the stencil mask is used, the electron beam is passed through opening parts, and scattered at non-opening parts. The membrane mask includes a membrane formed of a light element through which the electron beam is transmitted easily, and a heavy metal pattern layer formed on the membrane to scatter the electron beam. As the membrane, silicon, a silicon nitride film or the like is used. As the pattern part, chromium (Cr), tungsten (W) or the like is used.

Since the opening part through which the beam of the stencil mask is transmitted pierces, low scattering or chromatic aberration does not occur unlike the membrane mask. Since an omission occurs in the toroidal patterns because of its structure, however, masking cannot be conducted. Therefore, a complementary mask is used, and a technique of coping with the problem by conducting exposure a plurality of times is used. Such coping poses a problem in position alignment and throughput. Furthermore, cantilever patterns and long and narrow patterns are apt to become low in mechanical strength and be broken. On the other hand, the membrane mask can be formed in the toroidal patterns as well, because there is the membrane part. However, the toroidal patterns and the cantilever patterns tend to become weak in mechanical strength in the same way. Furthermore, in the membrane mask, low scattering is caused even it is slight when the electron beam is transmitted through the membrane, resulting in a drawback of occurrence of chromatic aberration.

When attempting collective projection exposure on preamble patterns in patterned media, it is necessary to prepare a mask having openings of a plurality of parallel continuous strip-shaped pattern portions. However, such slender openings have a problem that mask flexion causes optical hindrance in projection and the mask strength becomes weak.

In the patterned media, the floating stability of the magnetic recording and reproducing head poses a problem as described above.

In addition, in the reduction projection exposure process used when fabricating a patterned medium, there is a problem in strength of long and narrow patterns such as the preamble part of the reticle for exposure.

SUMMARY OF THE INVENTION

A magnetic disc medium according to a first aspect of the present invention includes: a preamble part in a servo area of each of sectors obtained by dividing a surface of the medium in a circumference direction, the preamble part comprising strip-shaped patterns formed of a plurality of magnetic materials, and each of the strip-shaped patterns formed of the magnetic materials being divided by non-magnetic materials at periodic intervals.

A magnetic disc medium according to a second aspect of the present invention includes: a plurality of tracks formed of magnetic materials provided in a circumference direction in a data area of a sector divided in the circumference direction; and non-magnetic guard zones provided between adjacent tracks in the tracks, parts of the adjacent tracks being joined to each other by the same magnetic materials as those of the tracks.

A magnetic recording and reproducing apparatus according to a third aspect of the present invention includes: a magnetic disk medium including a preamble part in a servo area of each of sectors obtained by dividing a surface of the medium in a circumference direction, the preamble part comprising strip-shaped patterns formed of a plurality of magnetic materials, and each of the strip-shaped patterns formed of the magnetic materials being divided by non-magnetic materials at periodic intervals, the periodic interval being substantially equal to a width of the head; and a head which relatively moves on the magnetic disk medium at time of recording and reproducing.

A magnetic recording and reproducing apparatus according to a fourth aspect of the present invention includes: a magnetic disk medium including a preamble part in a servo area of each of sectors obtained by dividing a surface of the medium in a circumference direction, the preamble part comprising strip-shaped patterns formed of a plurality of magnetic materials, and each of the strip-shaped patterns formed of the magnetic materials being divided by non-magnetic materials at periodic intervals, the periodic interval being substantially equal to an effective width of the head; and a head which relatively moves on the magnetic disk medium at time of recording and reproducing.

A reticle to be used to fabricate a magnetic disk medium according to a fifth aspect of the present invention includes: a data area comprising a plurality of tracks formed of magnetic materials provided in a circumference direction and non-magnetic guard zones provided between adjacent tracks in the tracks, parts of the adjacent tracks being joined to each other; and a servo area which comprises a preamble part and which divides the tracks into sectors in the circumference direction.

BRIEF DESCRIPTION OF THE DRAWINGS

FIG. 3 is a schematic top view of a magnetic disk medium according to the first embodiment;

FIGS. 4A and 4B are sectional views obtained by cutting a magnetic disk medium according to the first embodiment along a radial direction;

FIG. 5 is a diagram showing an example of a servo area;

FIGS. 7A, 7B and 7C are diagrams showing a magnetic disk medium according to a second embodiment;

FIGS. 13A to 13F are sectional views showing manufacturing processes of a magnetic disk medium manufacturing method according to the second example;

DETAILED DESCRIPTION OF THE INVENTION

Hereafter, embodiments of the present invention will be described with reference to the drawings.

First Embodiment

A magnetic disk medium according to a first embodiment of the present invention will now be described with reference to FIGS. 1A to 6. A magnetic disk medium according to the present embodiment is a patterned medium. Its schematic configuration is shown in FIGS. 3 to 5. FIG. 3 is a top view of a patterned medium 1. FIGS. 4A and 4B are sectional views obtained by cutting a data area of the patterned medium 1 along the radial direction. FIG. 5 is a diagram showing a servo area of the patterned medium 1.

As shown in FIG. 3, the patterned medium 1 includes a data area 11 and a servo area 12. The data area 11 is an area where user data are recorded. The data area 11 has a pattern in which tracks formed of magnetic materials formed in an annular form are arranged at periods of a definite length (track pitch Tp) via non-magnetic parts. The tracks formed of magnetic materials formed in the annular form are divided into sectors in the circumference direction by the servo area 12. In FIG. 3, the tracks are divided into fifteen sectors. As a matter of fact, the tracks may be divided into fifty or more sectors.

The servo area 12 is an area where information for positioning the magnetic head is formed by a magnetic material/non-magnetic material. The servo area 12 takes the shape of a circular arc which becomes the head access locus of the magnetic recording apparatus. The length in the circumferential direction of the servo area becomes long in proportion to the radial position (see FIG. 3).

In the patterned media, there are typically two kinds: magnetic material working type media and substrate working type media.

As shown in FIGS. 4A and 4B, the data area is an area onto/from which user data is recorded/reproduced by using the magnetic head. As a recording layer 6 on which user data can be recorded, the magnetic tracks are formed of magnetic layers including ferromagnetic materials (for example, CoCrPt). FIG. 4A is a sectional view obtained by cutting the magnetic material working type medium along the radial direction. FIG. 4B is a sectional view obtained by cutting the substrate working type medium along the radial direction.

Figure 6:
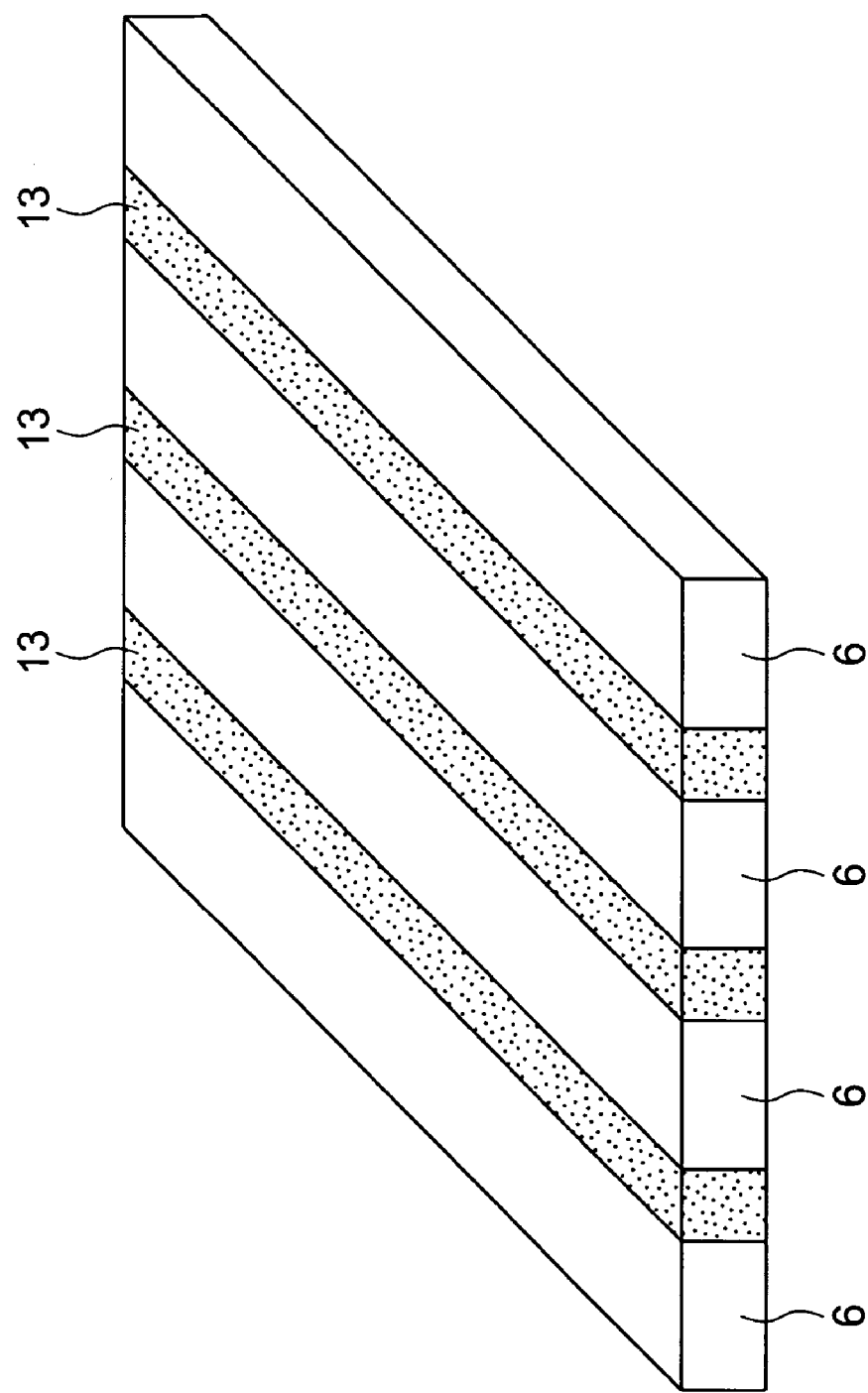
FIG. 6 is a diagram showing an example of a data area according to the first embodiment.

The recording layer 6 formed of the ferromagnetic material is provided via an underlying layer 4 formed of a soft magnetic material formed on a substrate 2. The substrate 2 may be a glass substrate or an aluminum substrate. In the magnetic material working type media, there is a groove-shaped non-magnetic guard zone 7 formed by shaving off the recording layer 6 between adjacent tracks by means of etching as shown in FIG. 4A. In the substrate working type medium, the underlying layer 4 formed of the magnetic layer and the soft magnetic material is formed on concave parts and convex parts on the surface of the substrate 2 as shown in FIG. 4B. Data is recorded on the recording layer 6 and the underlying layer 4 which are magnetic layers formed on the convex parts of the substrate 2. Magnetic layers 6a formed on concave parts of the substrate 2 are away from the head position. Since recording and reproducing cannot be conducted on the magnetic layers 6a by using the head, the magnetic layers 6a become non-recording areas between adjacent tracks. In other words, there are groove-shaped non-magnetic guard zones 7 between adjacent tracks. In both the magnetic material working type and the substrate working type, there are grooves between adjacent recording tracks formed of magnetic materials. If nothing is embedded in the grooves as shown in FIGS. 4A and 4B, the air becomes the non-magnetic materials. Non-magnetic materials may be embedded in the grooves. Therefore, recording tracks 6 formed of adjacent magnetic materials are divided by non-magnetic materials. For example, recording tracks 6 formed of magnetic materials are divided by non-magnetic materials 13 as shown in FIG. 6.

Although not illustrated in FIGS. 4A and 4B, a protection film formed of DLC (Diamond Like Carbon) is formed on the surface of the medium in a thin film form, and a lubricant is applied. A width Tw of the magnetic track in the radial direction is set to be greater than the width of the non-magnetic guard zone 7. In the magnetic disk medium according to the present embodiment, the ratio of the magnetic material/the non-magnetic material in the radial direction is 2:1. In other words, the patterns have an occupation factor of 67% of the magnetic material. In FIGS. 4A and 4B, Tp represents the data track pitch.

Details of the pattern of the servo area 12 will now be described with reference to FIG. 5.

As shown in FIG. 5, the data area 11 described earlier is provided on both sides of the servo area 12. The servo area 12 includes a preamble part 12a, address parts 12b and 12c, a position deviation detection burst part 12d (hereafter referred to as burst part 12d as well) and a gap part 12e. The servo area 12 is formed as a pattern of a magnetic material/non-magnetic material in the same way as the data area 11. From the viewpoint of recording capacity improvement, it is desirable that the occupation rate of the data area 11 is high. It is desirable that the data area 11 occupies at least 90% and the servo area occupies 10% or less.

The preamble part 12a is provided to conduct PLL (Phase-Locked Loop) processing for synchronizing the servo signal reproduction clock against time deviation caused by rotation eccentricity of the patterned medium 1 and AGC (Automatic Gain Control) processing for keeping the reproduced signal amplitude proper. The preamble part 12 is formed of magnetic materials/non-magnetic materials which nearly take the shape of an arc extending in the radial direction and which continue radially. The preamble part 12 has patterns which repeat in the circumferential direction. The ratio of the magnetic materials to the non-magnetic materials is approximately 1:1. In other words, the preamble part 12 is formed with a magnetism occupation factor of approximately 50%. In addition, each linear pattern of magnetic material is divided at periods depending upon the width of the reproducing head and the skew angel.

In the address parts 12b and 12c, servo signal recognition codes 12 called servo marks, sector information and cylinder information are formed using the Manchester code with the same pitch as the pitch of the preamble part 12a in the circumferential direction. In particular, the cylinder information 12c becomes a pattern in which the information changes every servo track. Therefore, code is converted to a code called Gray code which minimizes a change from an adjacent track to mitigate the influence of an address reading error during the seeking operation, and then the resultant code is converted to the Manchester code and recorded. The magnetic occupation factor of the address parts 12b and 12c also becomes approximately 50%.

The burst part 12d is an off-track detection area used to detect an off-track quantity of the cylinder address from the on-track state. Four marks called A, B, C and D bursts staggered in pattern phase in the radial direction are formed in the burst part 12d. A plurality of marks are arranged in each of the A, B, C and D bursts at the same pitch periods as those in the preamble part 12a. Its period in the radial direction is in proportion to the change period of the address pattern. In other words, the period in the radial direction is set equal to a period in proportion to the servo track period. In the magnetic disk medium according to the present embodiment, each burst is formed over ten periods in the circumferential direction. In the radial direction, each burst has a pattern which repeats at periods which are twice in length the servo track periods. Each of the masks is formed to become basically a square, strictly speaking, to take the shape of a parallelogram with due regard to the skew angle at the time of head access. The mark parts are formed as non-magnetic parts. The off-track quantity is calculated by conducting arithmetic processing to obtain an average amplitude value of signals reproduced from the A, B, C and D burst parts in the burst part 12d.

Features of the magnetic disk medium according to the present embodiment will now be described with reference to FIG. 1A. In the preamble part 12a on the magnetic disk medium according to the present embodiment, a plurality of recording pattern strips formed of magnetic materials 14 (in FIG. 1A, patterns formed of magnetic materials extending in the vertical direction are provided with non-magnetic materials 15 between. Strips in respective recording patterns are divided by the non-magnetic materials 15 at intervals equal to the width of the reproducing head 110.

In the conventional structure of the recording patterns in the preamble part 12a, a plurality of parallel continuous strip-shaped recording patterns are arranged so as to cross the tracks. In the present embodiment, however, strip-shaped recording patterns formed of adjacent magnetic materials 14 are divided by the non-magnetic materials 15 at periodic intervals. As a result, the problem of the floating stability of the head which poses the problem in the conventional technique can be solved. In other words, if the strip-shaped patterns in the preamble part 12 are divided at definite periodic intervals, it becomes hard for the air flow between the magnetic head and the magnetic disk medium to flow in a direction crossing the tracks unlike the state of the conventional parallel continuous strip-shaped patterns crossing the tracks. The state of the air flow is close to the state in which strip-shaped patterns are arranged in the data area along the tracks. Even if the floating head moves from the data area on the magnetic disk medium to the servo area at the time of recording or reproducing, therefore, there is no disorder in the air flow and the stable floating of the magnetic head is obtained.

In addition, each of adjacent strip-shaped recording patterns formed of magnetic materials is divided by the non-magnetic materials 15. Unlike the reticle for the conventional magnetic disk medium, therefore, the reticle used to manufacture the magnetic disk medium according to the present embodiment does not have long and narrow openings, resulting in high strength.

In the preamble part 12a on the magnetic disk medium according to the present embodiment, it is desirable that the period of strip division in the recording-patterns is equal to the width of the reproducing head 110. If the periodic interval of strip division in the recording patterns in the preamble part 12a is equal to the width of the reproducing head 110, then the area of overlapping of the reproducing head 110 and the magnetic materials 14 in strips in the recording patterns caused when the reproducing head 110 passes through strips in the recording patterns becomes nearly constant independent of the head position and the sweeping direction of the head as shown in FIG. 2(a). Therefore, a reproduced signal which is always constant is obtained as shown in FIG. 2(b). As a result, it is possible to always obtain a signal having a constant intensity independent of the head position which is a necessary condition for the preamble part 12a.

(Modification)

Figures 1A, 1B:
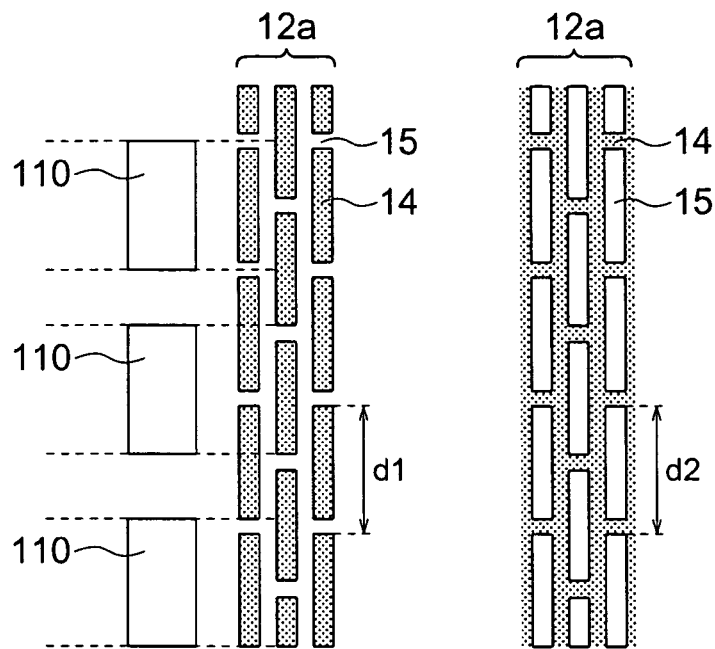
FIGS. 1A and 1B are diagrams showing patterns in a preamble part on a magnetic disk medium according to a first embodiment.
Figure 2:
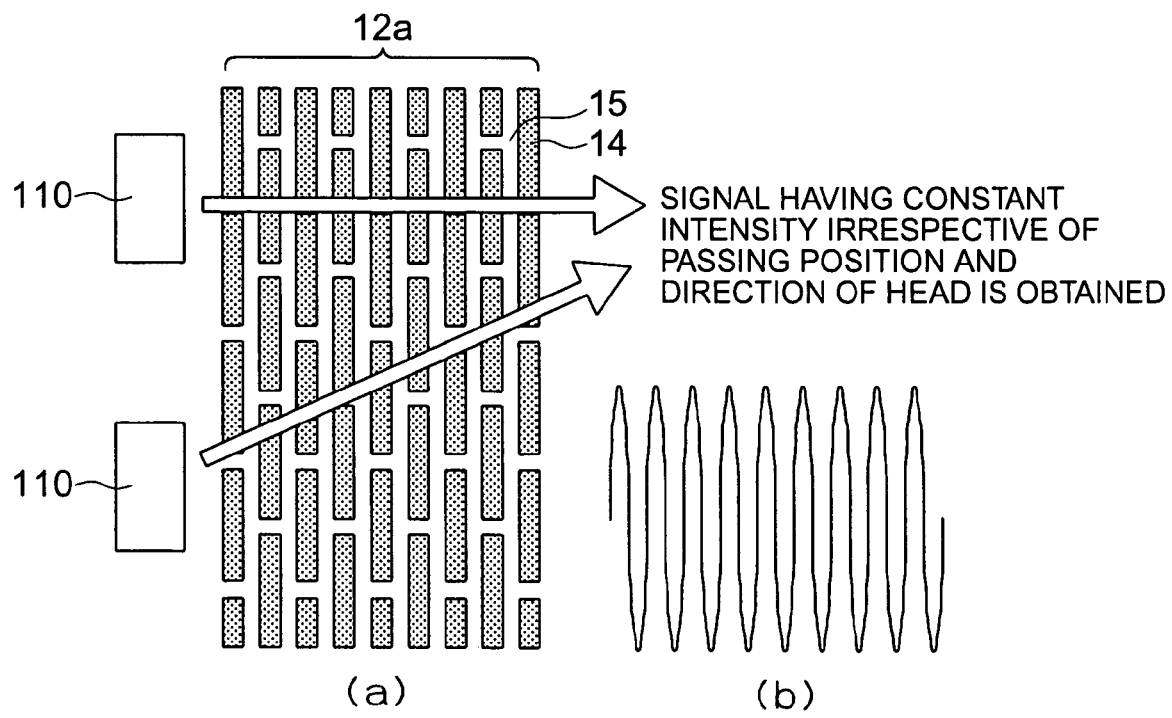
FIGS. 2(a) and 2(b) are a diagram showing that a definite reproduced signal is obtained from a magnetic disk medium according to the first embodiment.

Even if the recording patterns formed of magnetic materials and non-magnetic materials in the preamble part 12a are recording patterns shown in FIG. 1B obtained by inverting the magnetic materials 14 and the non-magnetic materials 15 in the recording patterns shown in FIG. 1A, effects similar to those in the present embodiment can be obtained. In other words, the recording patterns in the preamble part 12a shown in FIG. 1B have a plurality of rows in which a plurality of non-magnetic materials 15 having the same shape are arranged periodically in a direction nearly perpendicular to the recording tracks, in strips formed of the magnetic materials 14. And the non-magnetic materials 15 in adjacent rows are staggered to each other. The interval of one period of the non-magnetic materials 15 in each row is set equal to the width of the reproducing head 110. The preamble part 12a shown in FIG. 1B can be represented by the same expression as that of the preamble shown in FIG. 1A. In other words, strips in the recording patterns formed of the magnetic materials 14 are periodically divided by the non-magnetic materials 15 as in the case shown in FIG. 1A. The periodic interval of the division is nearly equal to the width of the reproducing head 110. Unlike the case shown in FIG. 1A, adjacent strips are connected via the magnetic material 14.

Second Embodiment

A magnetic disk medium according to a second embodiment of the present invention will now be described with reference to FIGS. 7A, 7B and 7C.

Typically in the magnetic recording and reproducing apparatuses, a recording and reproducing head attached to an arm moves on a magnetic disk medium to record and reproduce magnetic recording information on the magnetic disk medium. However, the relative angle between the track direction on the magnetic disk medium and the arm, i.e., the skew angle varies depending upon the position of the recording and reproducing head. In the first embodiment, strips in the recording patterns formed of the magnetic materials 14 in the preamble part 12a are divided periodically by the non-magnetic materials 15. The periodic interval of the division is nearly equal to the width of the reproducing head 110 irrespective of the skew angle. The present embodiment is configured so as to make the periodic interval of the recording patterns in the preamble part 12a equal to a change of the effective width (reading width) of the reproducing head caused by a change of the skew angle.

In the magnetic recording and reproducing apparatus, a recording and reproducing head 110 is attached to a tip of an arm 130 as shown in FIG. 7A. The arm 130 is rotated by a voice coil motor which is not illustrated. As a result, the recording and reproducing head 110 can be moved to an arbitrary radial position on the magnetic disk medium 1. In this case, an angle of elevation of the recording and reproducing head 110 with respect to the track direction, i.e., the skew angle changes by a rotating position of the arm 130.

If the skew angle of the reproducing head 110 with respect to the track direction changes, then the effective width of the reproducing head 110 with respect to the track also changes accordingly as shown in FIG. 7A. As shown in FIGS. 7B and 7C, therefore, the periodic interval of the recording patterns in the preamble part 12a in the present embodiment changes from an internal circumference to an outer circumference on the magnetic disk medium 1 according to the effective width of the reproducing head 110 depending upon the skew angle of the reproducing head 110. And the periodic interval of the recording patterns in the preamble part 12a in the present embodiment is made equal to the effective width of the reproducing head 110 in any track position. FIG. 7B shows the case where the skew angle=0, i.e., the case where the arm 130 lies in a position perpendicular to the radial direction of the magnetic disk medium 1. In this case, the periodic interval of the recording patterns in the preamble part 12a is nearly equal to the width W of the reproducing head 110, i.e., the effective width. FIG. 7C shows the case where the skew angle ≠0, i.e., the case where the radial direction of the magnetic disk medium 1 is not perpendicular to the arm 130. In this case, the periodic interval of the recording patterns in the preamble part 12a is not equal to the actual width W of the reproducing head 110, but nearly equal to the effective width W1.

In the present embodiment, it is possible to obtain a favorable reproduced signal by making the periodic interval in the recording patterns in the preamble part 12a nearly equal to the effective width of the reproducing head 110 depending upon the skew angle of the reproducing head 110 as shown in FIGS. 7B and 7C.

The magnetic disk medium in the present embodiment also has fine floating stability of the reproducing head in the same way as the first embodiment. Since the reticle used to manufacture the magnetic disk medium according to the present embodiment does not have long and narrow openings in the same way as the first embodiment, the strength becomes high.

In the magnetic disk medium 1 according to the first embodiment (inclusive of the modification, the same shall apply hereinafter) and the second embodiment, it suffices that a division interval d1 between a strip in a recording pattern and an adjacent strip in the recording pattern in the preamble part 12a(see FIG. 1A) and an interval d2 connecting adjacent recording pattern strips (see FIG. 1B) is at least equal to the reading width (effective width) of the reproducing head 110. The interval d1 or the interval d2 may be 1/N (where N is a natural number) of the effective width of the reproducing head 110. In this case as well, a reproduced signal having a constant intensity which does not depend on the position of the reproducing head 110 is obtained.

Third Embodiment

Figure 8:
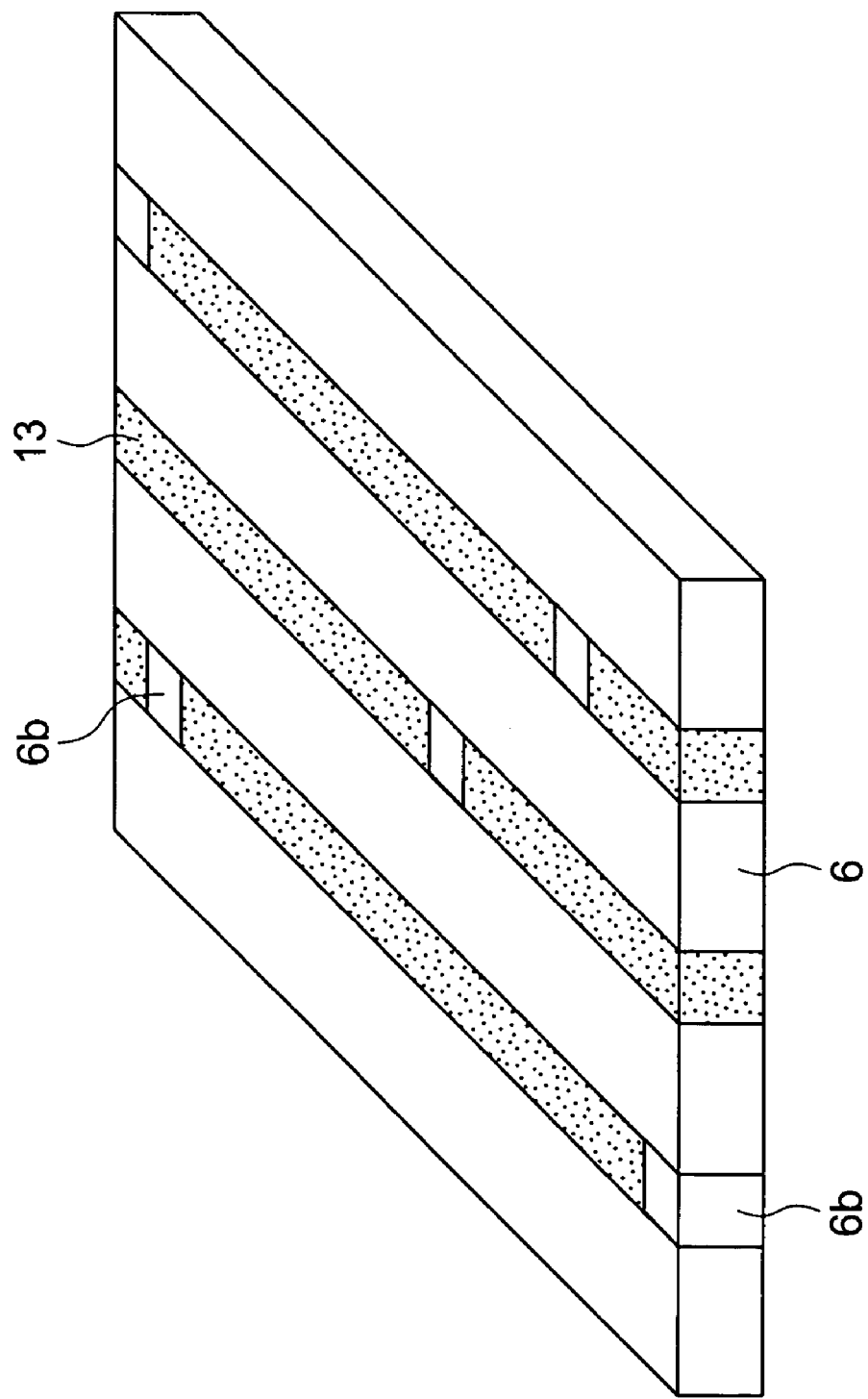
FIG. 8 is an oblique view showing a data area of a magnetic disk medium according to a third embodiment.

A magnetic disk medium according to a third embodiment of the present invention will now be described with reference to FIG. 8. The magnetic disk medium according to the present embodiment is a patterned medium. As shown in FIG. 8, recording tracks 6 formed of magnetic materials in the data area are separated by non-magnetic materials 13. In parts between adjacent recording tracks 6 formed of magnetic materials, support parts 6b formed of magnetic materials are provided in the track width direction. In other words, adjacent recording tracks 6 are joined by the support parts 6b formed of the same magnetic material. The support parts 6b are shown to have the same height as the tracks 6. As a matter of fact, the support parts 6b may be made lower than the tracks 6. The non-magnetic material 13 is shown to have a non-magnetic material embedded therein and have the same height as that of the magnetic material parts 6 and the support parts 6b. As a matter of fact, the non-magnetic material 13 may cover the support parts 6b. Or the non-magnetic material 13 may be gas such as air, and may be uneven.

In the reticle used to manufacture the magnetic disk medium according to the present embodiment, parts corresponding to the support parts 6b are provided in the data area. Therefore, it becomes possible to increase the strength of the reticle.

By the way, in the magnetic disk medium according to the present embodiment, the preamble part in the servo area may include recording patterns formed of parallel continuous strip-shaped magnetic materials in the same way as the conventional magnetic disk medium. Furthermore, the preamble part in the servo area may have a configuration in which strips in the recording patterns formed of magnetic materials are periodically divided by non-magnetic materials, in the same way as the magnetic disk medium in the first or second embodiment. In this case, there is no disorder in the air flow and the stable floating of the magnetic head is obtained when the magnetic disk medium is mounted on a magnetic recording and reproducing apparatus, in the same way as the first and second embodiments.

For reference, reduction projection exposure using the reticle which is used to manufacture the magnetic disk media according to the first to third embodiments will now be described with reference to FIG. 9.

Figure 9:
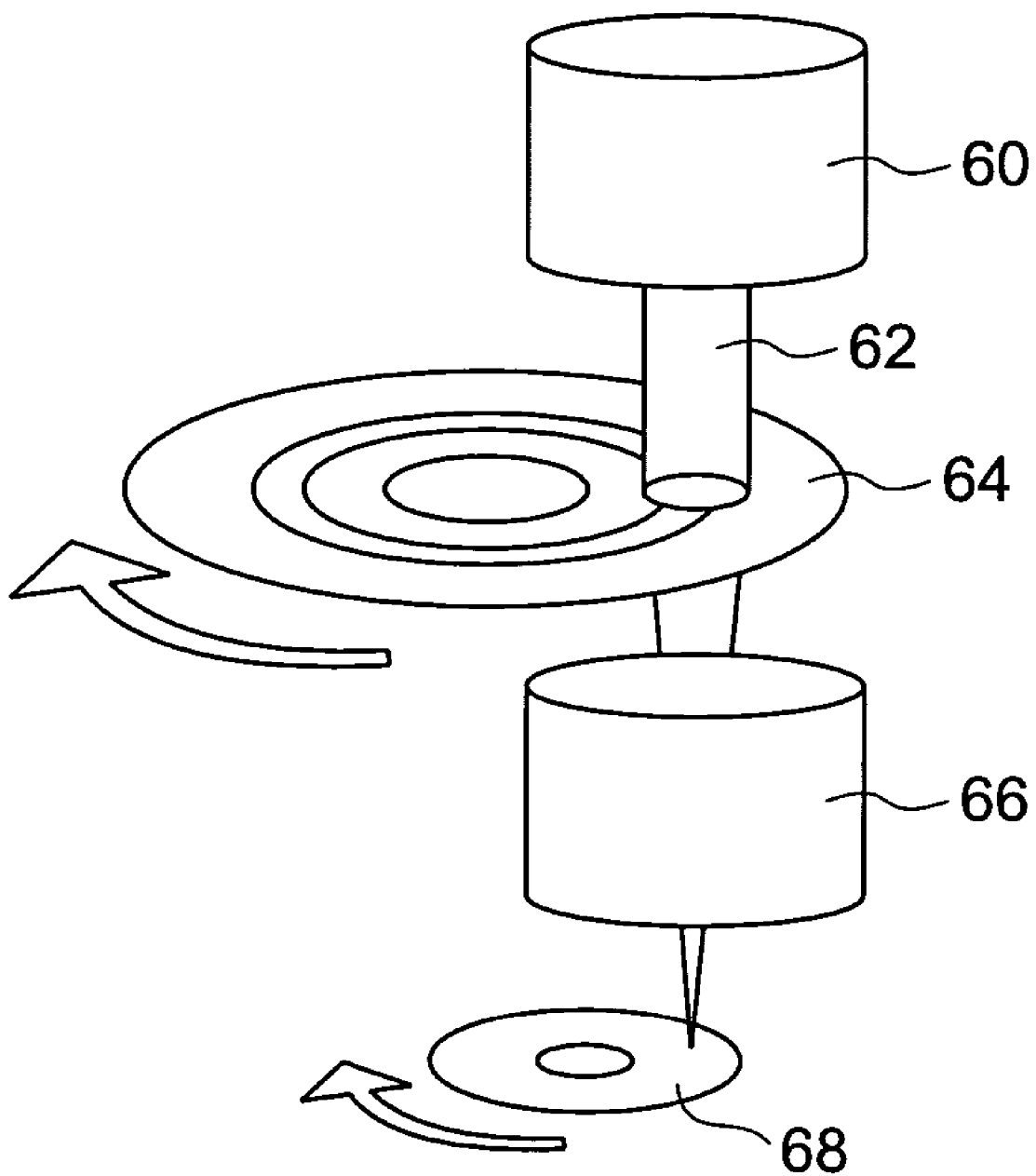
FIG. 9 is a diagram showing a reduction projection exposure technique.

In the reduction projection exposure, a reticle 64 which has a predetermined pattern and which transmits an electron beam is used as shown in FIG. 9. This reticle 64 is inserted between an electron gun 60 and a reduction lens 66. An electron beam 62 emitted from the electron gun 60 is applied to the reticle 64 with a certain sectional area. The electron beam 62 is transmitted according to a pattern on the reticle 64 and directed to the reduction lens 66. The reduction lens 66 has a function of reducing the radiation sectional area of the electron beam 62 to one several-th. The electron beam 62 transmitted through the reduction lens 66 is applied onto an original disk 68. The electron beam transmitted through the pattern on the reticle 64 and reduced to one several-th by the reduction lens 66 is projected onto the original disk 68. As a result, an EB irradiating pattern projected onto the original disk 68 becomes a minute pattern having a size which is one several-th of the pattern on the reticle 64 according to the reduction factor of the reduction lens 66. The rays used in reduction projection exposure may be chemical rays other than the electron beam, such as excimer laser light like KrF, ArF or $F_2$, or mercury lamp light such as i-rays or g-rays.

Since the pattern in the preamble part on the conventional magnetic disk medium includes a plurality of parallel continuous strip-shaped patterns which cross tracks. Therefore, the reticle for reduction projection exposure having the strip-shaped patterns has parallel continuous long and narrow openings. Occurrence of mask flexion causes a problem that optical hindrance occurs in projection and the mask strength becomes weak.

In the magnetic disk medium according to the first or second embodiment, however, the strip-shaped recording patterns formed of the magnetic materials, in the preamble part has a structure divided at periodic intervals by the non-magnetic materials. Therefore, the reticle for reduction projection exposure used to manufacture the magnetic disk medium has an advantage that the mask strength can be maintained sufficiently because openings are divided intermittently. Accordingly, the reticle for reduction projection exposure used to manufacture the magnetic disk medium according to the first or second embodiment has no mask flexion, and a correct pattern can be drawn on the original disk.

If a resist on the original disk is positive type, a region exposed to chemical rays such as the electron beam transmitted through the reticle becomes a concave part after development. A stamper is fabricated by using Ni electroforming on the basis of the original disk. Imprinting is conducted by using the stamper or its grandchild stamper. If a magnetic disk medium of magnetic material working type is fabricated, or a substrate is worked in the same way by using the stamper and a magnetic film is formed on the substrate, openings of the reticle finally become concave parts (non-magnetic parts) on the magnetic disk medium. Therefore, the preamble part as shown in FIG. 1B can be formed on the magnetic disk medium by providing intermittent openings on the reticle.

On the other hand, if a resist on the original disk is negative type, a region exposed to chemical rays such as an electron beam transmitted through the reticle becomes a convex part after development. A stamper is fabricated by using Ni electroforming on the basis of the original disk. Imprinting is conducted by using the stamper or its grandchild stamper. If a magnetic disk medium of magnetic material working type is fabricated, or a substrate is worked in the same way by using the stamper and a magnetic film is formed on the substrate, openings of the reticle finally become convex parts (magnetic parts) on the magnetic disk medium. Therefore, the preamble part as shown in FIG. 1A can be formed on the magnetic disk medium by providing intermittent openings on the reticle.

A preamble part with the magnetic parts and the non-magnetic parts interchanged can also be formed by using a stamper with convex parts and the concave parts interchanged.

The reticle for reduction projection exposure used to manufacture the magnetic disk medium according to the third embodiment has an advantage that the mask strength can be maintained sufficiently in the same way as the reticle described earlier. The reticle has no mask flexion, and a correct pattern can be drawn on the original disk. And a desired pattern can be formed on the magnetic disk medium.

EXAMPLES

Hereafter, examples of the present invention will be described.

First Example

A manufacturing method of the reticle according to a first example of the present invention will now be described with reference to FIGS. 10A to 11C. The reticle (mask) manufactured by using the manufacturing method according to the present example is stencil type, and it is used to manufacture the magnetic disk medium according to the first or second embodiment.

Figure 10A:
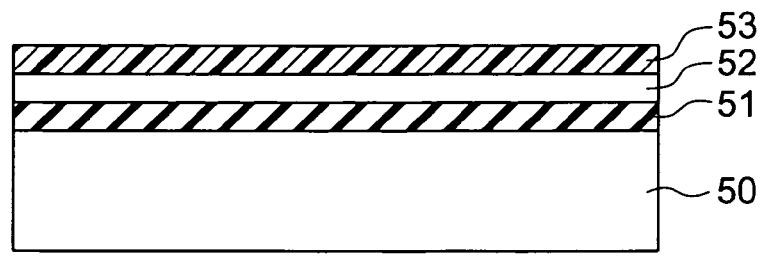
FIGS. 10A to 10D are sectional views showing manufacturing processes of a reticle manufacturing method according to a first example.
Figure 10B:
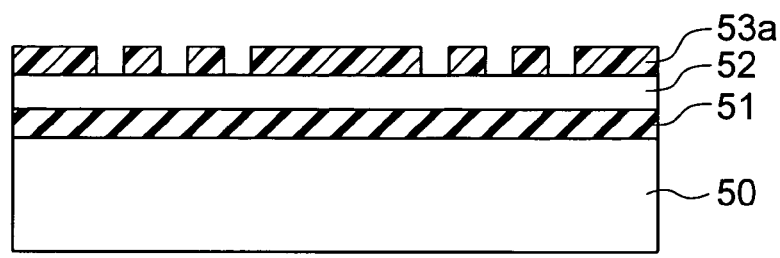

First, a silicon oxide film 51 which serves as a stopper at the time of etching is formed on a silicon substrate 50 as shown in FIG. 10A. A SOI (Silicon on Insulator) layer 52 is formed on the silicon oxide film 51 to prepare an SOI substrate. A resist (ZEP-520) produced by NIPPON ZEON CORP. is diluted to 1.5 times with anisole, filtered by using a membrane filter of 0.2 µm, spin-coated, and pre-baked at 200° C. for three minutes to form a resist film layer 53 having a thickness of 0.2 µm on the SOI layer 52 (see FIG. 10A).

Subsequently, this substrate is conveyed to a predetermined position in an electron beam lithography system (not illustrated) by a conveyance system in the electron beam lithography system. In a vacuum, a pattern obtained by magnifying a hard disk pattern to four times is transferred to the resist film layer 53 by exposing it to an electron beam. The pattern has a track pitch of 150 nm, and the reproducing head has a sensitivity width of 100 nm. Therefore, the track pitch width on the reticle is 600 nm. Opening parts in adjacent strip-shaped patterns in the preamble part on the reticle are exposed by using the electron beam lithography system so as to cause a head width of 100 nm in the radial direction and a head width of 400 nm on the reticle to become a joined structure at periods modulated according to the skew angle. After the exposure, the silicon substrate is immersed in ZED-N50 (produced by NIPPON ZEON CORP.) for 90 seconds to conduct development. Thereafter, the silicon substrate is immersed in a rinse solution (ZMD-B (produced by NIPPON ZEON CORP.)) for 90 seconds, rinsed, and dried by air blow to form a resist pattern 53a (see FIG. 10B).

Figure 10C:
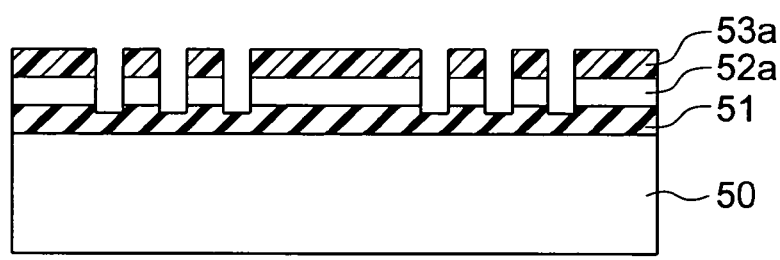

Subsequently, anisotropic etching is conducted on the SOI layer 52 until the silicon oxide film 51 is exposed to the surface by using the resist pattern 53a as a mask (see FIG. 10C). As a result, a patterned SOI layer 52a is obtained. Thereafter, the resist pattern 53a is removed.

Figure 10D:
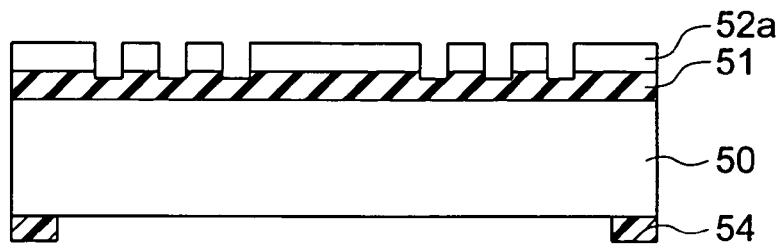
Figure 11A:
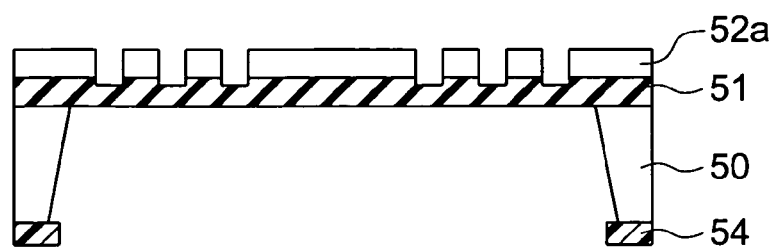
FIGS. 11A to 11C are sectional views showing manufacturing processes of a reticle manufacturing method according to the first example.
Figure 11B:
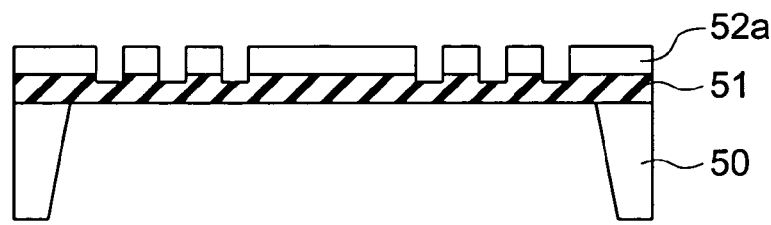
Figure 11C:
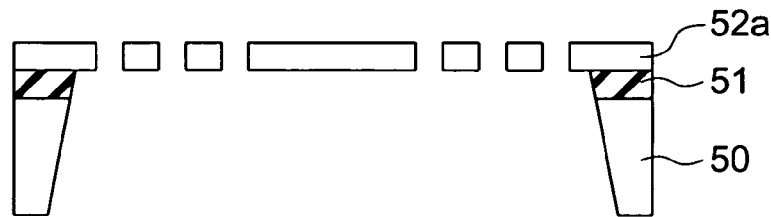

Subsequently, a resist is applied to the back of the silicon substrate 50, and a resist pattern 54 is formed by using the lithography technique (see FIG. 10D). Thereafter, the silicon substrate 50 is etched using KOH (potassium hydroxide) with a resist pattern 54 used as a mask until the silicon oxide film 51 is exposed to the surface (see FIG. 11A). Then the resist pattern 54 is removed (see FIG. 11B). In addition, the silicon oxide film 51 which lies between the silicon substrate 50 and the patterned SOI layer 52a and which is exposed to the surface is removed using fluoric acid to obtain a reticle (stencil mask) (see FIG. 11C).

In the reduction projection exposure using this reticle, stable pattern drawing can be conducted without distortion in openings as compared with the conventional reticle.

For the purpose of comparison, an original disk is fabricated using EB reduction projection exposure of four times and using a reticle in which the recording patterns formed of magnetic materials in the preamble part are not divided periodically by non-magnetic materials. As a result, pattern distortion occurs in a plurality of parallel strip-shaped openings in the preamble part of the reticle, and the reticle is damaged immediately after the fabrication.

On the other hand, in the reticle manufactured using the manufacturing method of the first example, the above-described damage in the preamble part of the reticle does not occur, and an original disk having an address signal and a burst signal which is small in corner roundness is obtained by reduction projection exposure. In a magnetic recording and reproducing apparatus mounting a patterned medium fabricated using the reticle, the head floats stably.

Second Example

A magnetic disk medium manufacturing method according to a second example of the present invention will now be described with reference to FIGS. 12A to 13F. The manufacturing method according to the present example uses the stencil mask (reticle) manufactured according to the first example.

Figure 12A:
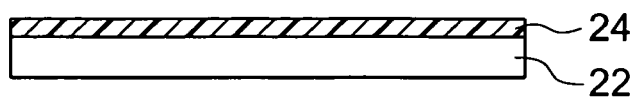
FIGS. 12A to 12G are sectional views showing manufacturing processes of a magnetic disk medium manufacturing method according to a second example.

On a silicon substrate 22 shown in FIG. 12A, a resist (ZEP-520) is diluted to twice with anisole, filtered by using a membrane filter of 0.2 µm, and spin-coated. Immediately thereafter, the resist is pre-baked at 200° C. for three minutes to form a resist 24 having a thickness of 0.1 µm.

Figure 12B:
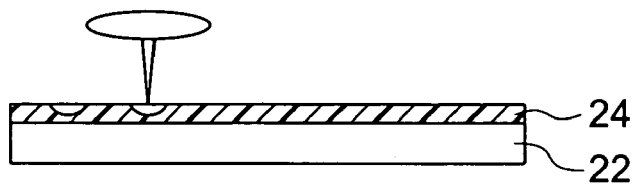
Figure 12C:
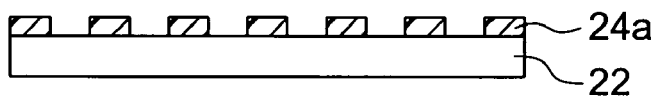

A pattern reduced to one fourth of the mask size is transferred to the resist 24 by exposing it to a beam with a reduction projection electron beam exposure system via the mask (reticle) obtained using the manufacturing method according to the first example (see FIG. 12B). After the exposure, the silicon substrate is immersed in a developing solution (ZED-N50 for 90 seconds to conduct development. Thereafter, the silicon substrate is immersed in a rinse solution (ZMD-B (produced by NIPPON ZEON CORP.)) for 90 seconds, rinsed, and dried by air blow to obtain a resist original disk having a resist pattern 24a (see FIG. 12C).

Figure 12D:
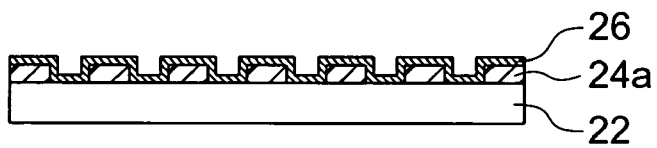

Subsequently, a thin conductive film 26 is formed on the resist original disk by using the sputtering method as shown in FIG. 12D. Pure nickel is used in a target. Sputtering is conducted for 40 seconds by using DC power of 400 W in a chamber vacuumed up to $8 \times 10^{-3}$ Pa, then filled with argon gas, and adjusted to 1 Pa. As a result, the conductive film 26 having a thickness of 30 nm is obtained.

Figure 12E:
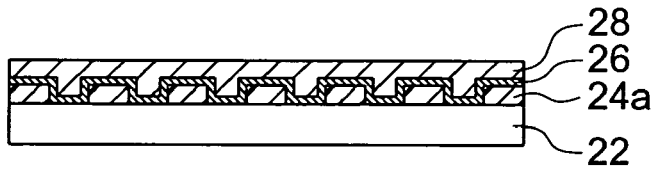

Thereafter, the resist original disk having the conductive film 26 is electroformed for 90 minutes by using a nickel sulfamate plating solution (NS-160 produced by SHOWA CHEMICAL CO., LTD.) to form an electroformed film 28 (see FIG. 12E). Electroforming bath conditions are as follows:

Nickel sulfamate: 600 g/L

Boric acid: 40 g/L

Surface active agent (sodium lauryl sulfate): 0.15 g/L

Temperature of solution: 55° C.

pH.: 4.0

Current density: 20 A/dm$^2$

The electroformed film 28 obtained at this time has a thickness of 300 µm.

Figure 12F:
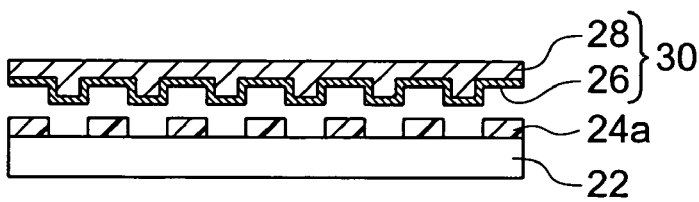
Figure 12G:
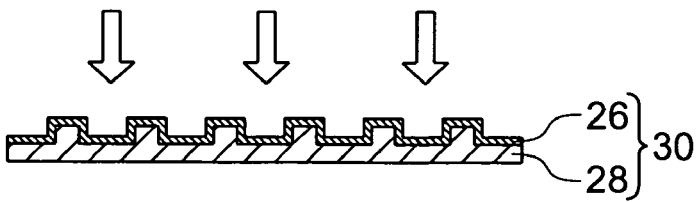

Thereafter, a stamper 30 including the conductive film 26, the electroformed film 28 and a resist residue is obtained by stripping the electroformed film 28 from the resist original disk (see FIG. 12F). Subsequently, the resist residue is removed by using the oxygen plasma ashing method (see FIG. 12G). As for the oxygen plasma ashing, plasma ashing is conducted with 100 W for 20 minutes in a chamber filled with oxygen gas at a rate of 100 ml/min and adjusted to 4 Pa. As a result, a father stamper 30 including the conductive film 26 and the electroformed film 28 is obtained. Thereafter, a stamper for imprinting is obtained by stamping out an unnecessary part of the obtained stamper with a metal edge.

Ultrasonic cleaning is conducted on the stamper 30 for 15 minutes by using acetone. Thereafter, the stamper is immersed in a solution obtained by diluting fluoroalkylsilane $(CF_3(CF_2)_7CH_2CH_2Si(OMe)_3)$ (TSL8233 produced by GE TOSHIBA SILICONES) to 5% with ethanol, for 30 minutes in order to increase the release at the time of imprinting. After the solution is blown off by a blower, the stamper 30 is annealed at 120° C. for one hour.

(Generation of Magnetic Disk Medium of Magnetic Material Working Type)

On the other hand, as shown in FIG. 13A, a substrate obtained by forming a magnetic recording layer 32 for vertical recording on a worked material substrate 31 which is a 0.85 inch toroidal-shaped glass substrate is prepared. A novolak resist (S1801 produced by ROHM AND HAAS ELECTRONIC MATERIALS) is spin-coated on the magnetic recording layer 32 at the number of revolutions of 3,800 rpm to form a resist film 34. Thereafter, position alignment of the stamper 30 with the worked material substrate 31 is conducted. And a pattern is transferred onto the resist film 34 by pressing the stamper 30 with 2,000 bar for one minute (see FIG. 13B). The resist film 34 having the transferred pattern is exposed to UV (ultraviolet rays) for five minutes, and then heated at 160° C. for 30 minutes.

Oxygen RIE (reactive ion etching) is conducted on the resist film 34 of the substrate imprinted as heretofore described under an etching pressure of 2 mTorr by using an ICP (inductively coupled plasma) etching system to form a resist pattern 34a (see FIG. 13C). Subsequently, the magnetic recording layer 32 is etched using Ar ion milling and using the resist pattern 34a as a mask to form a discrete magnetic recording layer 32a (see FIG. 13D). After the magnetic recording layer 32a is formed, oxygen RIE is conducted with 400 W and 1 Torr in order to strip the resist pattern 34a which has served as the etching mask (see FIG. 13E).

After the magnetic recording layer 32a is formed, a DLC (Diamond Like Carbon) film having a thickness of 3 nm is formed as a protection film by using the CVD (chemical vapor deposition) (see FIG. 13F). In addition, a lubricant is applied to have a thickness of 1 nm by using the dipping method to obtain a magnetic disk medium of magnetic material working type. It is also desirable in that the surface shape can be adjusted in planarization so as to stabilize the head floating to form the magnetic recording layer 32a, then embed a non-magnetic material such as $SiO_2$ in grooves by sputtering or the like, and then form the DLC as the protection film.

The foregoing description concerns the manufacturing method of the magnetic disk medium of magnetic material working type. Hereafter, a manufacturing method of a magnetic disk medium of substrate working type will be described.

(Manufacturing Method of Magnetic Disk Medium of Substrate Working Type)

First, a 0.85 inch doughnut-shaped glass substrate is used as a worked material substrate. A novolak resist (S1801 produced by ROHM AND HAAS ELECTRONIC MATERIALS) is spin-coated on this glass substrate at the number of revolutions of 3,800 rpm to form a resist film. Thereafter, position alignment of the stamper with the worked material substrate is conducted. And a pattern is transferred onto the resist film by pressing the stamper with 2,000 bar for one minute. The resist film having the transferred pattern is exposed to UV (ultraviolet rays) for five minutes, and then heated at 160° C. for 30 minutes.

Oxygen RIE is conducted on the resist film of the substrate imprinted as heretofore described under an etching pressure of 2 mTorr by using an ICP (inductively coupled plasma) etching system to form a resist pattern. Subsequently, the glass substrate is etched using Ar ion milling and using the resist pattern as a mask. After the etching of the glass substrate, oxygen RIE is conducted with 400 W and 1 Torr in order to strip the resist pattern which has served as the etching mask. A magnetic recording layer is formed on the surface worked substrate thus obtained by using the sputtering method. A DLC film having a thickness of 3 nm is formed as a protection film by using the CVD (chemical vapor deposition). In addition, a lubricant is applied to have a thickness of 1 nm by using the dipping method to obtain a magnetic disk medium of substrate working type. It is also desirable in that the surface shape can be adjusted in planarization so as to stabilize the head floating to form the magnetic recording layer, then embed a non-magnetic material such as $SiO_2$ in grooves by sputtering or the like, and then form the DLC as the protection film in the same way as the magnetic material working type.

The magnetic disk medium generated in the present example has a track pitch of 150 nm and a reproducing head width of 100 nm. For the purpose of comparison, an original disk is fabricated using an electron beam lithography system having a beam diameter of 50 nm without using reduction projection. A magnetic disk medium having the same size as that of the present example is manufactured and mounted on a magnetic recording and reproducing apparatus. As a result, the floating of the head is not stabilized. The head comes in contact with the medium and head crash is caused.

Third Example

A magnetic recording and reproducing apparatus according to a third example of the present invention will now be described with reference to FIGS. 14 to 16. The magnetic recording and reproducing apparatus of the present example has a magnetic disk medium according to any of the first to third embodiments mounted thereon.

Figure 14:
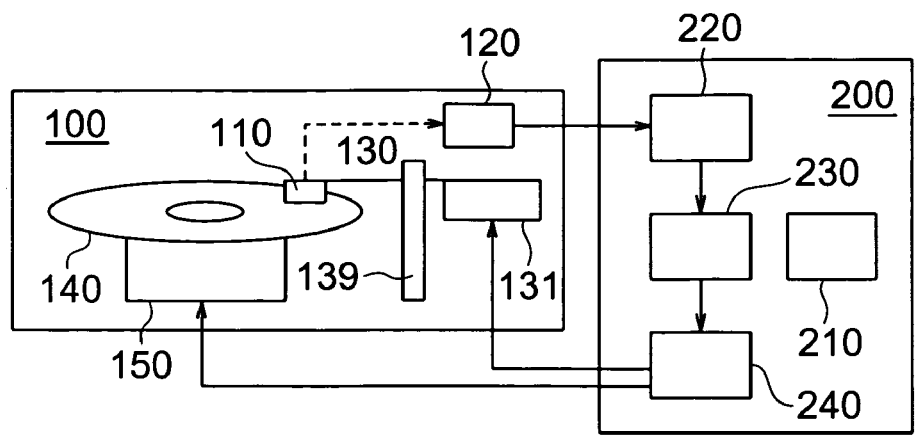
FIG. 14 is a block diagram showing a magnetic recording and reproducing apparatus according to a third example.

FIG. 14 shows a magnetic recording and reproducing apparatus according to the present example. FIG. 14 is a configuration concept diagram including one head. The magnetic disk apparatus according to the present example has a drive in which recording and reproducing are conducted on both sides of a small diameter patterned medium each having a two-layer vertical magnetization film worked for DTR (discrete track recording), by using two heads. A down head and an up head are provided on the top side and the bottom side, respectively.

The configuration of the magnetic recording and reproducing apparatus is basically the same as that of the conventional recording and reproducing apparatus except that the magnetic disk medium is a magnetic disk medium according to any of the first to third examples.

The disk drive includes a main body part 100 referred to as head disk assembly (HDA) as well and a print circuit board 200 referred to as PCB as well.

The HDA includes a disk 140 worked for DTR on both sides, a spindle motor (SPM) 150 which rotates the disk 140, a head 110, a head moving mechanism, and a head amplifier (HIC) which is not illustrated.

In the head 110, a magnetic head element having a reproducing element (GMR element) and a writing element is mounted on a slider (ABS) which is the main body of the head. The head 110 is mounted on the head moving mechanism.

The head moving mechanism includes a suspension arm 130 which supports the head 110, a pivot axis 139 which supports the suspension arm 130 so as to cause free rotation, and a VCM (voice coil motor) 131. The VCM 131 generates rotation torque around the pivot axis on the suspension arm 130, and moves the head 110 in the radial direction of the disk 140. The head amplifier (HIC) which amplifies the input and output signals of the head 110 and which is not illustrated is fixed on the suspension-arm 130 and electrically connected to the PCB 200 by a flexible cable (FPC which is not illustrated). In the configuration of the present example, the HIC is installed on the head moving mechanism in order to increase the signal-to-noise ratio of the head signal. Alternatively, a configuration in which the HIC is fixed to the main body part may be adopted.

The DTR disk medium 140 has two sides as described above. The DTR disk medium 140 is incorporated in a direction in which the head moving locus nearly coincides with the circular arc shape of the servo area pattern. It is a matter of course that the disk specifications should satisfy the outside diameter, the inside diameter, and recording and reproducing characteristics suitable for the driving in the same way as the conventional technique. The circular arc shape of the servo area is shaped to have a circular arc center on a circumference having a distance between the disk rotation center and the pivot center as a radius position and have a distance between the pivot and the magnetic head element as the circular arc radius. (PCB)

Four system LSIs are mainly mounted on the PCB. The four system LSIs are a disk controller (HDC) 210, a read/write channel IC 220, a MPU 230 and a motor driver IC 240.

The MPU 230 is a controller of the drive system. The MPU 230 has a configuration including a ROM, a RAM, a CPU and a logic processor which implements a head positioning control system concerning the present example. The logic processor is an arithmetic operation processor including a hardware circuit, and it is used in fast arithmetic operation processing. This operation software (FW) is stored in the ROM. The MPU 230 controls the drive according to the FW.

The HDC 210 is an interface in the hard disk. The HDC 210 serves as an interface between the disk drive and the host system (such as a personal computer), exchanges information with the MPU, the read/write channel IC and the motor driver IC, and manages the whole drive.

The read/write channel IC 220 is a head signal processor relating to reading/writing. The read/write channel IC 220 includes a circuit which conducts channel switching on the HIC and conducts processing on the recording and reproducing signal such as reading/writing.

The motor driver IC 240 is a driver for the VCM and SPM. The motor driver IC 240 controls the spindle motor to drive it to constant rotation, supplies a VCM operation quantity from the MPU 230 to the VCM as a current value, and drives the head moving mechanism.

(Head Positioning System)

The head positioning system will now be described briefly with reference to FIG. 15.

Figure 15:
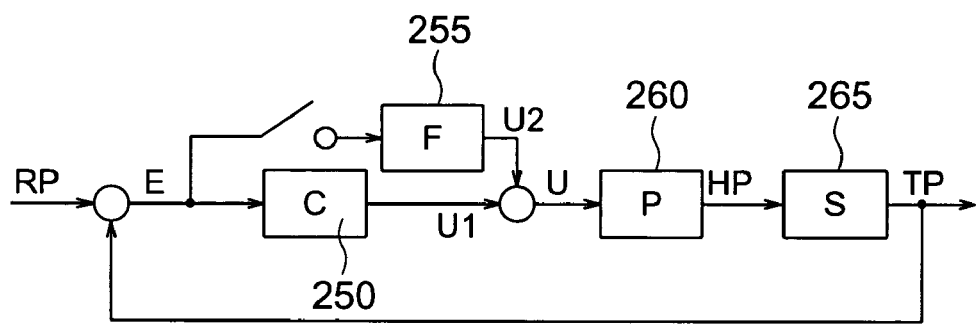
FIG. 15 is a block diagram showing head positioning control in a magnetic recording and reproducing apparatus according to the third example.

FIG. 15 is a block configuration diagram for head positioning control. A control target 260 is specifically corresponds to a head mover including a VCM. A signal processor 265 is specifically an element implemented by the channel IC and the MPU. (A part of off-track quantity detection processing is implemented by the MCU.)

A control processor includes a feedback controller 250 (hereafter referred to as first controller as well) and a synchronization suppression compensator 255 (hereafter referred to as second controller as well). Specifically, the control processor is implemented by the MPU.

Details of operation in the signal processor 265 will be described later. The signal processor 265 generates information of current track position (TP) on the disk on the basis of a reproduced signal including address information supplied from the disk servo area located right under the head position (HP).

The first controller 250 outputs an FB operation value U1 in a direction decreasing the position error on the basis of a position error (E) between a target track position (RP) on the disk and the current head position (TP) on the disk.

The second controller 255 is an FF compensator which corrects the track shape on the disk and vibration synchronized to the disk rotation. The second controller 255 stores rotation synchronized compensation values calibrated beforehand in a memory table. Typically, the second controller 255 does not use the position error (E), but refers to the table on the basis of servo sector information which is supplied from the signal processor S and which is not illustrated, and outputs an FF operation value U2.

The control processor adds outputs U1 and U2 respectively of the first and second controllers 250 and 255, supplies a resultant control operation value U to the VCM via the HDC and drives the head.

The synchronization compensation value table is subject to calibration processing at the time of initial operation. If the position error (E) becomes greater than a preset value, however, recalibration processing is started and processing of updating the synchronization compensation values is conducted.

(Operation and Position Information Detection Processing in Drive)

How the position error is detected from the reproduced signal will now be described briefly with reference to FIG. 16.

The disk is rotated at a constant rotation speed by the SPM 150. The head 110 is supported elastically via gimbals provided on the suspension arm 130. The floating design is conducted so as to keep a minute gap by balance with an air pressure caused by disk rotation. As a result, the head reproducing element can detect leak magnetic flux from the disk magnetic layer with a constant magnetic air gap.

As a result of this rotation, the servo area signal on the magnetic disk medium 140 passes right under the head at constant periods. Servo processing at constant periods can be executed by detecting track position information from the servo area reproduced signal.

Once a servo area identification flag called servo mark is recognized, it becomes possible for the HDC to predict timing when the servo area comes right under the head because of constant periods. Therefore, the HDC urges the channel to start the servo processing at timing when the preamble part comes right under the head.

(Signal Processing in Channel)

Figure 16:
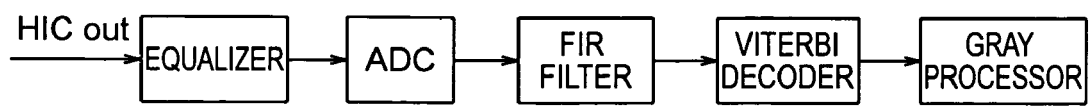
FIG. 16 is a diagram showing address reproduction processing in a channel of a magnetic recording and reproducing apparatus according to the third example.

FIG. 16 shows an address reproducing processing configuration in the channel. A signal output from the head amplifier IC in the reproducing head is read into the channel IC, subjected to analog filter processing (longitudinal signal equalization processing), and sampled as a digital value in an ADC.

The leak magnetic field from the magnetic disk medium is vertical magnetization and a pattern from magnetic material/non-magnetic material. However, the DC offset components are completely removed by the high-pass characteristics of the HIC and equalizer processing conducted at the head of the channel IC to execute the longitudinal equalization. Output of the analog filter for a signal obtained from the preamble part becomes nearly a quasi-sine wave. A difference from the conventional vertical magnetized media is that the magnitude of the signal amplitude is reduced to half.

The magnetic disk media are not restricted to the patterned media. Depending upon which of the leak magnetic flux directions of the servo area is taken, however, a failure in code detection in the channel is caused by false recognition of 1 and 0. Therefore, the head polarity is set properly according to the pattern leak magnetic flux.

In the channel IC, its processing is switched according to its reproduced signal phase. Synchronous pulling processing for synchronizing the reproduced signal clock to the media pattern period, address deciphering processing for reading sector cylinder information, and burst part processing required to detect the offset quantity are conducted.

Although detailed description of the synchronous pulling processing will be omitted, timing of ADC sampling is synchronized to a sinusoidal reproduced signal and AGC processing is conducted to align the signal amplitude of the digital sample value with a certain level. The 1-0 period in the medium pattern is sampled at four points.

Subsequently, in the reproduction of address information, noise in sample values is reduced by using the FIR filter. The sample values are converted to the sector information and track information via Viterbi decoding processing based upon maximum likelihood estimation and Gray code inverse conversion processing. As a result, servo track information of the head can be acquired.

Subsequently, in the burst part, the channel passes to off-track quantity detection processing. Although this processing is not illustrated, signal amplitudes are subject to sample-and-hold integration processing in the order of burst signal patterns A, B, C and D, and a voltage value corresponding to the average amplitude is output to the MPU. And a servo processing interrupt is issued to the MPU. Upon receiving this interrupt, the MPU reads the burst signals in the internal ADC in a time series, and conducts processing for converting the burst signals to the off-track quantity in a DSP. The servo track position of the head is detected precisely on the basis of this off-track quantity and the servo track information.

Fourth example

A manufacturing method of a magnetic disk medium according to a fourth example of the present invention will now be described. In the manufacturing method of the present example, a magnetic disk medium according to the third embodiment is manufactured.

First, the reticle for the magnetic disk medium according to the third embodiment is generated by using the manufacturing method according to the first example. Subsequently, the magnetic disk medium shown in FIG. 8 is generated by using the reticle and the manufacturing method described with reference to the second example.

The magnetic disk medium manufactured by using the manufacturing method according to the present example is incorporated into a magnetic recording and reproducing apparatus, and signal evaluation is conducted. As a result, a slightly different signal portion which is considered to occur in the support parts 6b between the tracks 6 is detected in a signal reproduced from the data area. However, differences in these signals have a level which does not pose a practical problem.

According to the embodiments of the present invention, it is possible to obtain a reticle having high strength and a magnetic disk medium manufactured by using the reticle. It is also possible to stabilize the head floating.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concepts as defined by the appended claims and their equivalents.

What is claimed is:

1. A magnetic disk medium comprising:
   a preamble part in a servo area of each of a plurality of sectors obtained by dividing a surface of the medium in a circumferential direction, the preamble part comprising elongated portions each elongated in a radial direction, each of the elongated portions comprising strip-shaped patterns formed of magnetic material, each of the strip-shaped patterns in each of the elongated portions being divided by non-magnetic material at periodic intervals in the radial direction, and divided positions of the strip-shaped patterns in adjacent elongated portions in the circumferential direction being different from each other.

2. The magnetic disk medium according to claim 1, wherein strip-shaped patterns adjacent in the circumferential direction are spaced apart by the non-magnetic material.

3. The magnetic disk medium according to claim 1, wherein strip-shaped patterns adjacent in the circumferential direction are connected by the magnetic material.

4. The magnetic disk medium according to claim 1, further comprising a plurality of tracks formed of magnetic material provided in a circumferential direction in a data area of a sector divided in the circumferential direction; and non-magnetic guard zones provided between adjacent tracks in the tracks,
wherein parts of the adjacent tracks are joined to each other by the same magnetic material as that of the tracks.

5. A magnetic recording and reproducing apparatus comprising:
a magnetic disk medium including a preamble part in a servo area of each of a plurality of sectors obtained by dividing a surface of the medium in a circumferential direction, the preamble part comprising elongated portions each elongated in a radial direction, each of the elongated portions comprising strip-shaped patterns formed of magnetic material, each of the strip-shaped patterns in each of the elongated portions being divided by non-magnetic material at periodic intervals in the radial direction, and divided positions of the strip-shaped patterns in adjacent elongated portions in the circumferential direction being different from each other; and
a head configured to relatively move on the magnetic disk medium at times of recording and reproducing,
the periodic interval being substantially equal to a width of the head.

6. The magnetic recording and reproducing apparatus according to claim 5, wherein strip-shaped patterns adjacent in the circumferential direction are divided by the non-magnetic material.

7. The magnetic recording and reproducing apparatus according to claim 5, wherein strip-shaped patterns adjacent in the circumferential direction are connected by the magnetic material.

8. The magnetic recording and reproducing apparatus according to claim 5, further comprising a plurality of tracks formed of magnetic material provided in a circumferential direction in a data area of a sector divided in the circumferential direction; and non-magnetic guard zones provided between adjacent tracks in the tracks,
wherein parts of the adjacent tracks are joined to each other by the same magnetic material as that of the tracks.

9. The magnetic recording and reproducing apparatus according to claim 5, wherein each of the patterns is island-shaped, non-magnetic material is embedded between the patterns, and a surface of the magnetic disk medium is planarized.

10. A magnetic recording and reproducing apparatus comprising:
a magnetic disk medium including a preamble part in a servo area of each of a plurality of sectors obtained by dividing a surface of the medium in a circumferential direction, the preamble part comprising elongated portions each elongated in a radial direction, each of the elongated portions comprising strip-shaped patterns formed of magnetic material, each of the strip-shaped patterns in each of the elongated portions being divided by non-magnetic material at periodic intervals in the radial direction, and divided positions of the strip-shaped patterns in adjacent elongated portions in the circumferential direction being different from each other; and
a head configured to relatively move on the magnetic disk medium at times of recording and reproducing,
the periodic interval being substantially equal to an effective width of the head.

11. The magnetic recording and reproducing apparatus according to claim 10, wherein strip-shaped patterns adjacent in the circumferential direction are divided by the non-magnetic material.

12. The magnetic recording and reproducing apparatus according to claim 10, wherein strip-shaped patterns adjacent in the circumferential direction are connected by the magnetic material.

13. The magnetic recording and reproducing apparatus according to claim 10, further comprising a plurality of tracks formed of magnetic material provided in a circumferential direction in a data area of a sector divided in the circumferential direction; and non-magnetic guard zones provided between adjacent tracks in the tracks,
wherein parts of the adjacent tracks are joined to each other by the same magnetic material as that of the tracks.

14. The magnetic recording and reproducing apparatus according to claim 10, wherein each of the patterns is island-shaped, non-magnetic material is embedded between the patterns, and a surface of the magnetic disk medium is planarized.

15. A reticle for use in fabricating a magnetic disk medium, the reticle comprising:
a first pattern of openings corresponding to a data area of the magnetic disk medium which comprises a plurality of tracks formed of magnetic material provided in a circumferential direction and non-magnetic guard zones provided between adjacent tracks in the data area, parts of the adjacent tracks in the data area being joined to each other; and
a second pattern of openings corresponding to a servo area of the magnetic disk medium which comprises a preamble part dividing the tracks into sectors in the circumferential direction.

16. The reticle according to claim 15, wherein the preamble part of the magnetic disk medium comprises elongated portions each elongated in a radial direction, each of the elongated portions comprising strip-shaped patterns, and
each of the strip-shaped patterns in the radial direction is divided by non-magnetic material at periodic intervals.

17. A disk-shaped magnetic recording medium comprising tracks divided into multiple sectors by servo areas extending in a generally radial direction, each servo area comprising preamble information embodied as a pattern of elongated portions, each elongated portion being elongated in a generally radial direction and comprising magnetic strip portions with non-magnetic material interposed between respective portions at periodic intervals in the radial direction.

18. The disk-shaped magnetic recording medium according to claim 17, wherein the periodic intervals vary from an inner radial portion of the recording medium to an outer radial portion of the recording medium.

* * * * *